United States Patent
Jin et al.

(10) Patent No.: US 7,283,442 B2
(45) Date of Patent: Oct. 16, 2007

(54) METHOD FOR CHOOSING THE DEFECT DETECTION MODE OF AN OPTICAL STORAGE DEVICE

(75) Inventors: Kuo-Wen Jin, Hsinchu (TW); Shou-Ren Tsai, Jhubei (TW); Wei-Guan Yau, Hsinchu (TW)

(73) Assignee: Mediatek Inc. (TW)

( * ) Notice: Subject to any disclaimer, the term of this patent is extended or adjusted under 35 U.S.C. 154(b) by 452 days.

(21) Appl. No.: 10/904,886

(22) Filed: Dec. 2, 2004

(65) Prior Publication Data

US 2005/0219973 A1 Oct. 6, 2005

(30) Foreign Application Priority Data

Mar. 31, 2004 (TW) .............................. 93108873 A (51) Int. Cl.
*G11B 7/00* (2006.01)

(52) U.S. Cl. .............................. 369/47.14; 369/53.16; 369/53.17

(58) Field of Classification Search .............. 369/47.14
See application file for complete search history.

(56) References Cited

U.S. PATENT DOCUMENTS

| | | | |
|---|---|---|---|
| 5,075,804 A * | 12/1991 | Deyring | 360/49 |
| 6,483,789 B1 * | 11/2002 | Kubota et al. | 369/53.16 |
| 6,563,776 B1 * | 5/2003 | Oi et al. | 369/53.15 |
| 2001/0010552 A1 * | 8/2001 | Nakajima | 348/246 |
| 2001/0021148 A1 * | 9/2001 | Yokoyama et al. | 369/44.32 |
| 2004/0223431 A1 * | 11/2004 | Lee et al. | 369/47.14 |
| 2005/0265170 A1 * | 12/2005 | Pan et al. | 369/47.14 |

* cited by examiner

*Primary Examiner*—Wayne Young
*Assistant Examiner*—Van T. Pham
(74) *Attorney, Agent, or Firm*—Connolly Bove Lodge & Hutz LLP (57) ABSTRACT

At least one detection area on an optical storage medium is allocated for data storage first, and then the detection area is set to a defect detection mode of either write detection or write verification, depending on the number of defects stated in a previous defect record. If the detection area is the write detection mode and the number of accumulated defects exceeds a default threshold value, the detection area would be configured anew and thereby set to a defect detection mode of write verification.

10 Claims, 7 Drawing Sheets

| detection area 1 L | detection area 2 M |
|---|---|
| detection area 3 M | detection area 4 L |

L: less defects
M: more defects

FIG. 4(a)

| detection area 1 D | detection area 2 V |
|---|---|
| detection area 3 V | detection area 4 D |

D: write detection mode
V: write verification mode

FIG. 4(b)

| detection area 1 D | detection area 2 V |
|---|---|
| detection area 3 V | detection area 4 V |

D:write detection mode
V:write verification mode

| detection area 1 D | detection area 2 D | detection area 3 D | detection area 4 D |
|---|---|---|---|
| detection area 5 D | detection area 6 D | detection area 7 D | detection area 8 D |

FIG. 6(a)

| detection area 1 D | detection area 2 V | detection area 3 V | detection area 4 D |
|---|---|---|---|
| detection area 5 D | detection area 6 D | detection area 7 V | detection area 8 D |

METHOD FOR CHOOSING THE DEFECT DETECTION MODE OF AN OPTICAL STORAGE DEVICE

BACKGROUND OF THE INVENTION

1. Field of the Invention

The present invention relates to a method for choosing the defect detection mode of an optical storage device, more particularly to a method for choosing the defect detection mode of an optical storage device before data are recorded on an optical storage medium.

2. Description of the Related Art

In the event of the existence of defects, for example, scratches, contamination and an intrinsic structural defect, in parts of an optical storage medium (such as a CD), predetermined data cannot be correctly stored on the parts of the optical storage medium. An attempt to read the stored data always ends in finding the data not retrievable and therefore not readable. In order to solve the aforesaid problem of finding unreadable data stored previously on the defective parts of an optical storage medium, related storage medium industry develops a kind of optical storage media with defect management, for example, re-writable CDs in Mount Rainier format, including commonly used CD-MRW discs and DAD+MAW discs.

Figure 1:
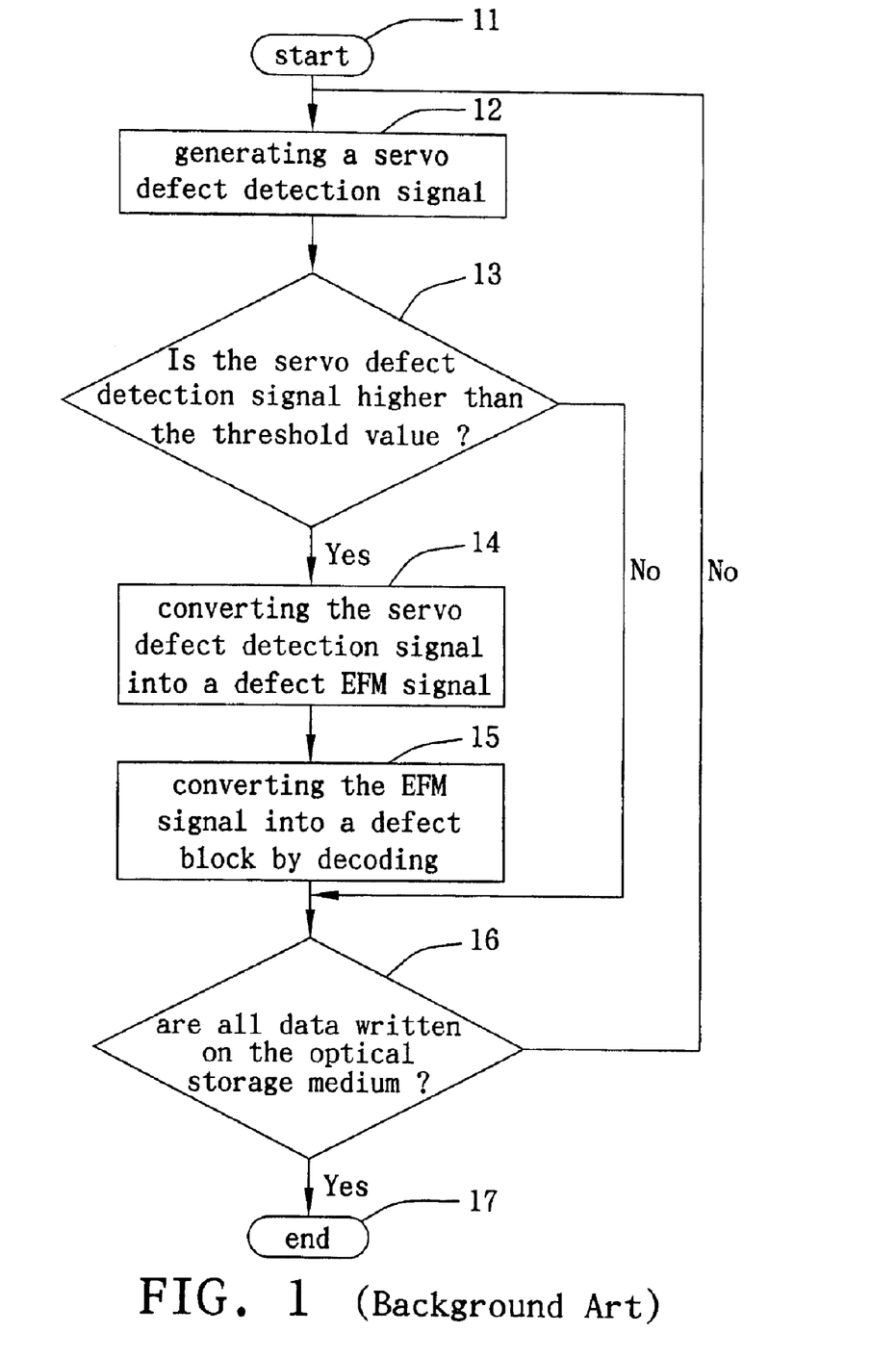
FIG. 1 is a flow chart about writing data under a write detection mode in accordance with a conventional defect detection technology.

It is necessary to develop the defect detection technology for identifying defective parts of an optical storage medium so as to ensure the completeness of the data intended for storage. The defect detection technology essentially involves two modes, namely write detection and write verification. In a write detection mode, a servo defect detection signal, which is generated when data is recorded on the optical storage medium, is compared with a default threshold value, as shown in Step 11, Step 12 and Step 13 of FIG. 1. If the servo defect detection signal is higher than the threshold value, then the servo defect detection signal is converted into a defect ELM (Eight to Fourteen Modulation; 8-14 Modulation) signal, as shown in Step 14. Afterward, the defect ELM signal is converted into a defect block by decoding, as shown in Step 15; in other words, a physical defect address is replaced with a logical defect address. If the servo defect detection signal is lower than the threshold value, then Step 16 follows Step 13 before the process continues. If the data have not yet been completely written on the optical storage medium, Step 16 is followed by a return to Step 12. Step 17 follows Step 16 only after all the data are completely stored. Then the whole process ends.

Figure 2:
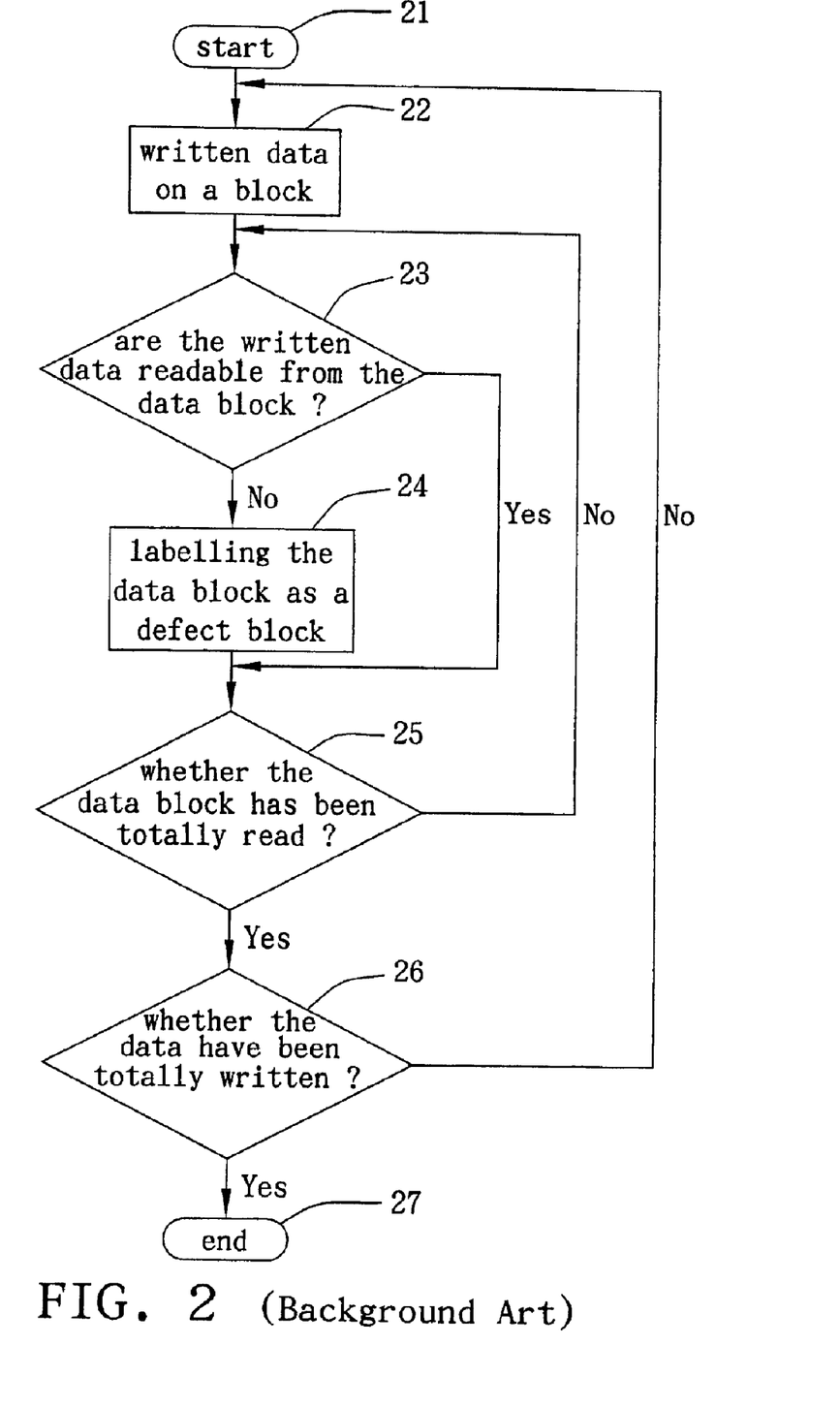
FIG. 2 is a flow chart about writing data under a write verification mode in accordance with a conventional defect detection technology.

FIG. 2 is a flow chart about writing data under a write verification mode in accordance with a conventional defect detection technology. As shown in Step 21, data are written on an optical storage medium first. In Step 22, part of the data are written in a data block. After writing the part of the data, whether the written data can be read out from the data block is confirmed, as shown in Step 23. If the written data cannot be read, the process flow proceeds to Step 24 and labels the data block as a defect block. Conversely, if the written data can be read, Step 25 is proceeded directly. In Step 25, whether the data block has been totally read is confirmed; if the data block has not yet been totally read, Step 23 is proceeded again to repeat the aforesaid steps. Otherwise, Step 26 is proceeded to confirm whether the data have been completely written on the optical storage medium. As shown in Step 27, the entire process does not end unless and until all the data are stored; otherwise, Step 22 is proceeded again to write the other unrecorded part of the data.

The write detection mode involves comparing a servo defect detection signal generated when data are written, such as an IF Signal or a Sub-Beam Add (SAD) Signal, with a threshold value directly, to quickly determine whether any defect is present in the current block. However, since a servo defect detection signal is usually a signal that results from retrieval of light reflection, it is rather difficult to decide on an optimal threshold value suitable for various status of defects; for example, reflective conditions vary with the area of a defect, a fingerprint contamination, or a scratch.

With the step of reading the written data, the write verification mode involves verifying repeatedly whether any defect is present. Hence, the write verification mode does identify defects efficiently, compared to the write detection mode that involves simple steps. Nevertheless, the write verification mode is time-consuming as it involves more steps.

To sum up, the conventional defect detection technology can merely choose either a write detection mode or a write verification mode to debug errors. Therefore, it does not assure an optical storage device of two merits, namely speediness and reliability, equally well, nor does it allow the defect detection mode of the optical storage device to be flexibly adjusted according to the actual locations of defects present in an optical storage medium.

SUMMARY OF THE INVENTION

The primary objective of the present invention is to provide a method for choosing the defect detection mode of an optical storage device. The defect detection mode is chosen according to the actual locations and densities of defects in an optical storage medium, hence two merits, namely speediness and reliability, concurrently exist.

In order to achieve the objective, the present invention discloses a method for choosing the defect detection mode of an optical storage device. At least one detection area on an optical storage medium is allocated for data storage first, and then the detection area is set to a defect detection mode of either write detection or write verification, depending on the number of defects stated in a previous defect record. If the detection area is the write detection mode and the number of accumulated defects exceeds a default threshold value, the detection area is configured anew and thereby set to a defect detection mode of write verification.

Furthermore, if the optical storage medium is an unformatted one, related defect records are absent. Hence, the detection area is directly set to a defect detection mode of write detection. If the detection area is the write detection mode and the number of accumulated defects exceeds a default threshold value, the detection area is configured anew and thereby set to a defect detection mode of write verification.

BRIEF DESCRIPTION OF THE DRAWINGS

The invention will be described according to the appended drawings in which:

FIGS. 3(*a*)-3(*c*) are schematic diagrams about dividing a program area into a plurality of detection areas in accordance with the present invention;

PREFERRED EMBODIMENT OF THE PRESENT INVENTION

Figure 3A:
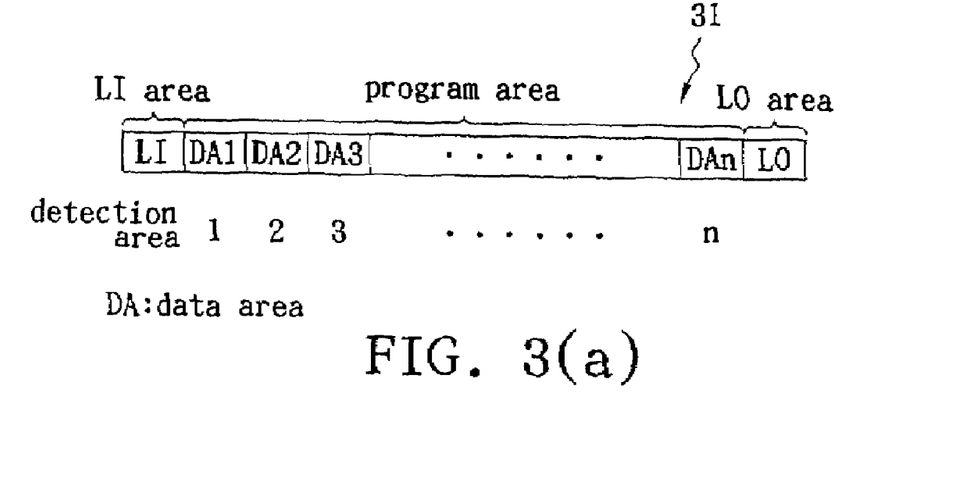
Figure 3B:
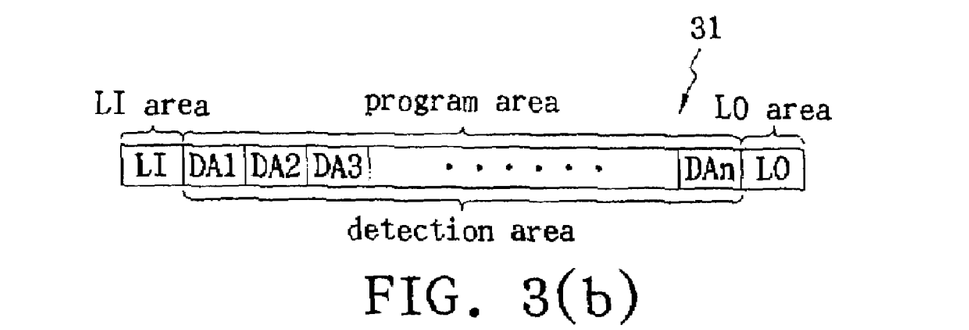
Figure 3C:
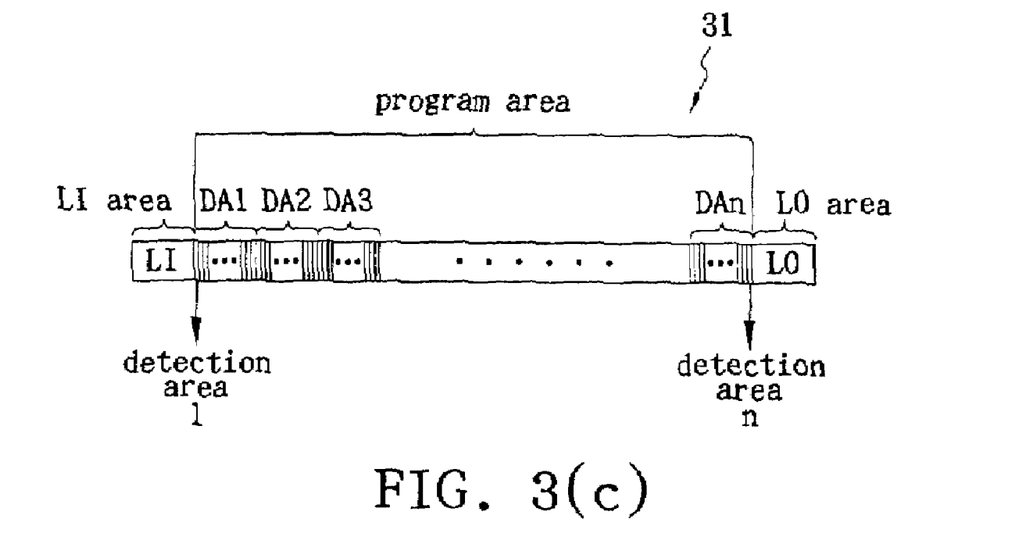

FIGS. 3(a)-3(c) are schematic diagrams about dividing a program area into a plurality of detection areas in accordance with the present invention. The data structure of the optical storage medium 31 is essentially divided into the following areas, ordered from innermost to outermost, a lead-in area (LI), a program area and a lead-out area (LO). The program area is further divided into a plurality of data areas (DA), as shown in FIG. 3(a). Referring to FIG. 3(a), the data areas DA1-DAn are designated as the detection areas 1-n respectively. However, the entire program area can also be deemed a single detection area, as shown in FIG. 3(b). Furthermore, each data area consists of a plurality of data packets, and each data packet or a plurality of data packets can also be designated as a detection area, as shown in FIG. 3(c). The present invention may be applied to a re-writable optical storage medium in Mount Rainier format that has a spare area (SA) interposed between two data areas as a substitute for a defective data area to store data.

Figure 4A:
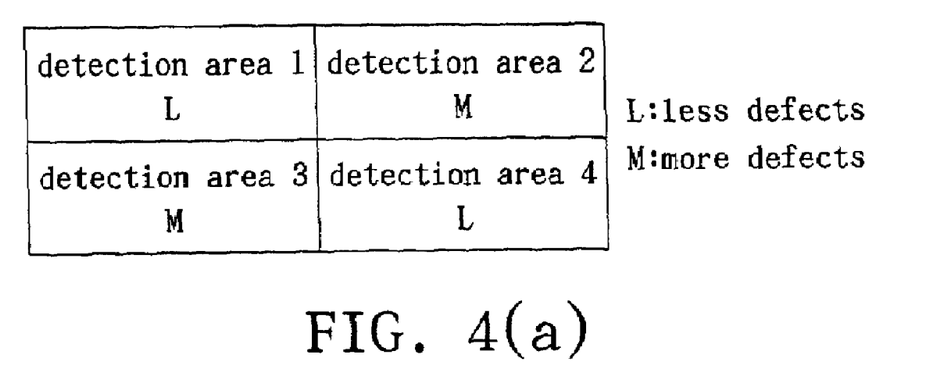
FIGS. 4(a)-4(c) are schematic diagrams about choosing a defect detection mode in accordance with the first embodiment of the present invention.
Figure 4B:
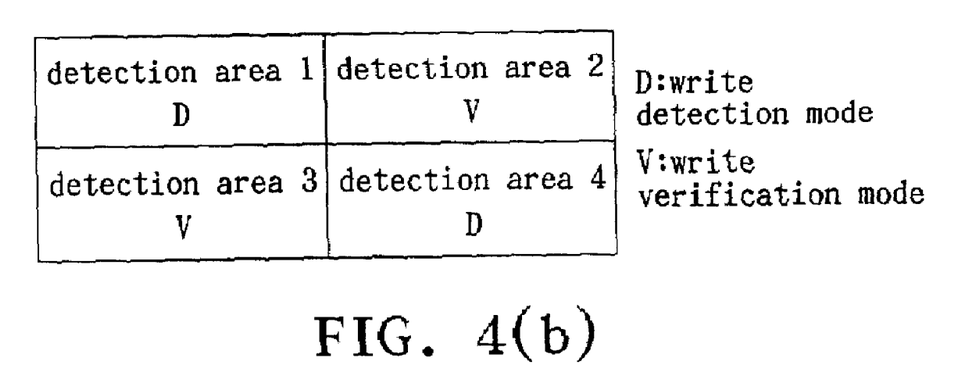
Figure 4C:
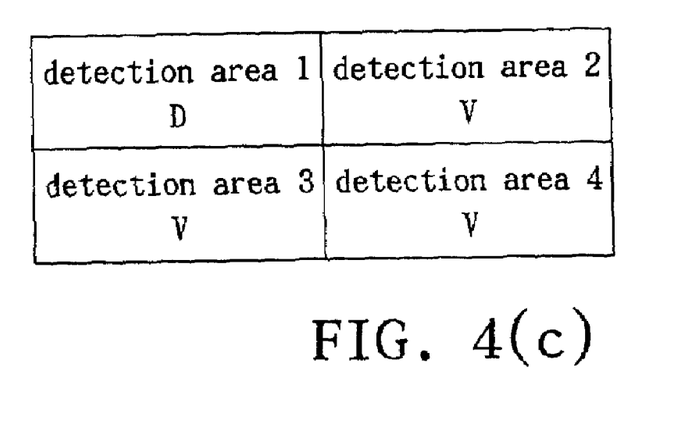

FIGS. 4(a)-4(c) are schematic diagrams about choosing a defect detection mode in accordance with the first embodiment of the present invention. The present preferred embodiment may be applied to a formatted optical storage medium. There are four default detection areas, intended to store data and disposed on the optical storage medium, as shown in FIG. 4(a). The quantity and the locations of the defects in the program area are recorded in a defect table when the optical storage medium is formatted, thus it is possible to know the number of the defects in the detection areas 1-4. The quantity of the defects either in the detection area 1 or in the detection area 4 is smaller than a threshold value; thus both of the detection areas 1 and 4 are set to a write detection mode D first, as shown in FIG. 4(b). The quantity of the defects either in the detection area 2 or in the detection area 3 is greater than the threshold value; thus both of the detection areas 2 and 3 are initially set to a write verification mode V. After the duration of a data writing operation and a defect detection operation according to the configuration illustrated with FIG. 4(b), it is possible to find some defects not listed in the defect table because subsequent improper usage may bring new defects. If the accumulated quantity of the defects in the detection area 4 exceeds the threshold value, the detection area 4 is changed from the write detection mode D to the write verification mode V, as shown in FIG. 4(c).

Figure 5:
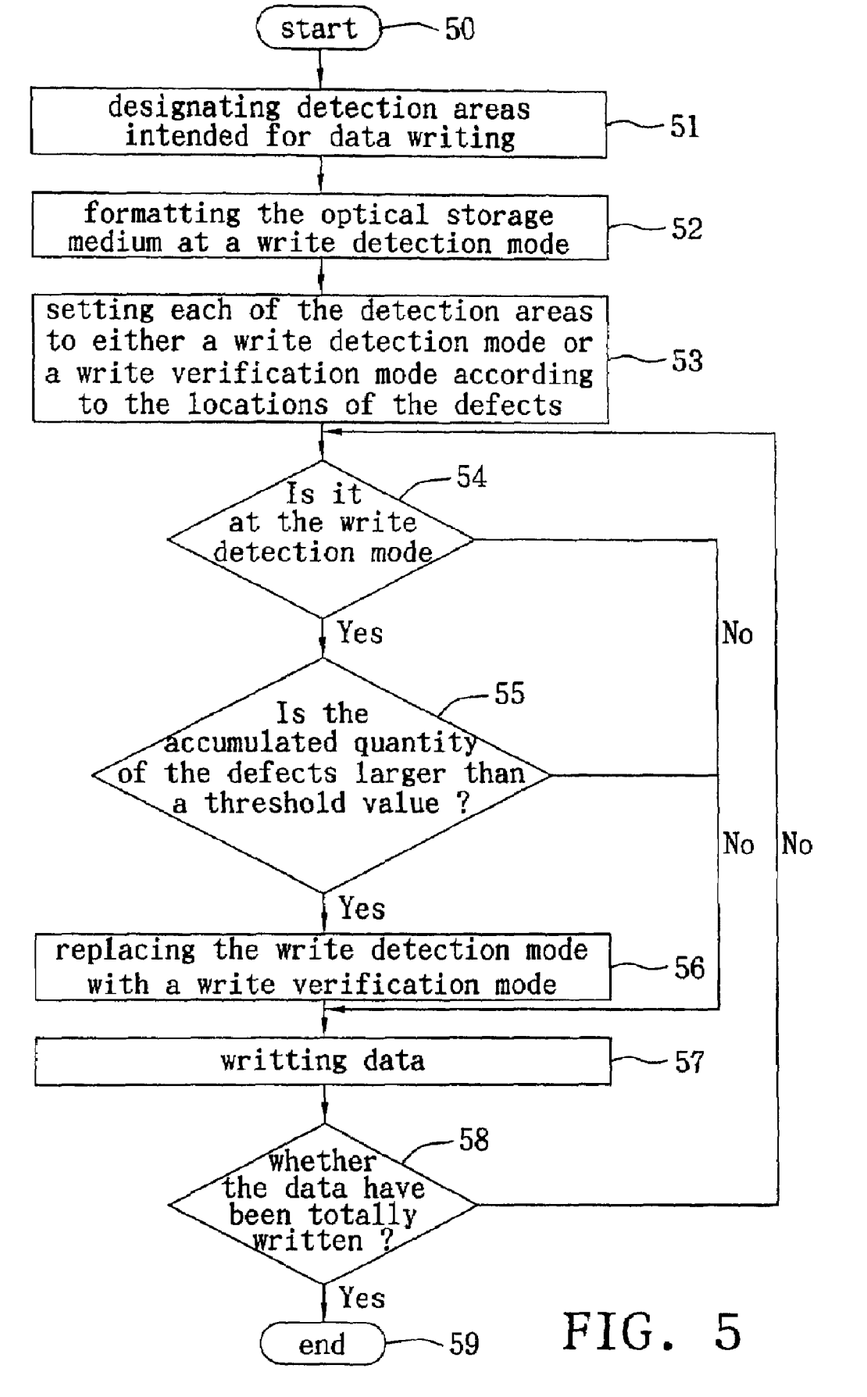
FIG. 5 is a flow chart about choosing a defect detection mode in accordance with the first embodiment of the present invention.

FIG. 5 is a flow chart about choosing a defect detection mode in accordance with the first embodiment of the present invention. On the commencement of data writing, an optical storage medium is allotted a plurality of detection areas intended for data writing, as shown in Steps 50 and 51. Then, according to the instructions of Step 52, the predetermined write detection areas on the optical storage medium are formatted at the write detection mode, and the number and locations of detected defects are recorded in a defect table. Meanwhile, the data originally stored in the detection areas are erased. In Step 53, each of the detection areas is set to either a write detection mode or a write verification mode according to the locations of the defects. That is, defect-related information found in the defect table is used to confirm whether the number of defects in each of the detection areas is greater than a threshold value. If the number of defects is greater than the threshold value, then the detection area is set to the write verification mode. Otherwise, the detection area is set to the write detection mode.

Once the detection area is set to the write detection mode, it is necessary to check whether the number of accumulated defects is greater than the threshold value during the actual defect detection operation. If the number of accumulated defects is greater than the threshold value, the detection area is configured anew and thereby set to a defect detection mode of write verification, as shown in Steps 54, 55 and 56. If the number of accumulated defects is still smaller than the threshold value, the defect detection mode need not be altered. If at the beginning the detection area is set to the write verification mode, what should be performed is to go directly to Step 57 to write data in the detection area rather than execute the operations of Steps 55 and 56. Once all the predetermined data are written in the plurality of detection areas, the whole process ends; otherwise it is still necessary to go back to Step 54 to execute related steps one by one, as shown in Steps 58 and 59.

Figure 6A:
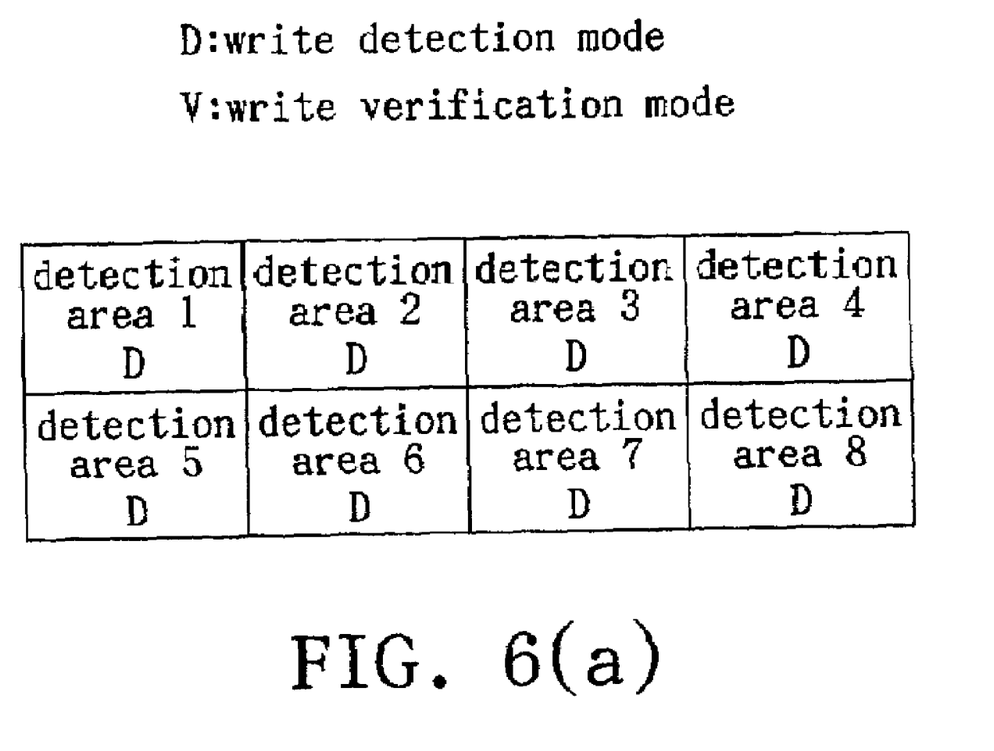
FIGS. 6(a)-6(b) are schematic diagrams about choosing a defect detection mode in accordance with the second embodiment of the present invention.
Figure 6B:
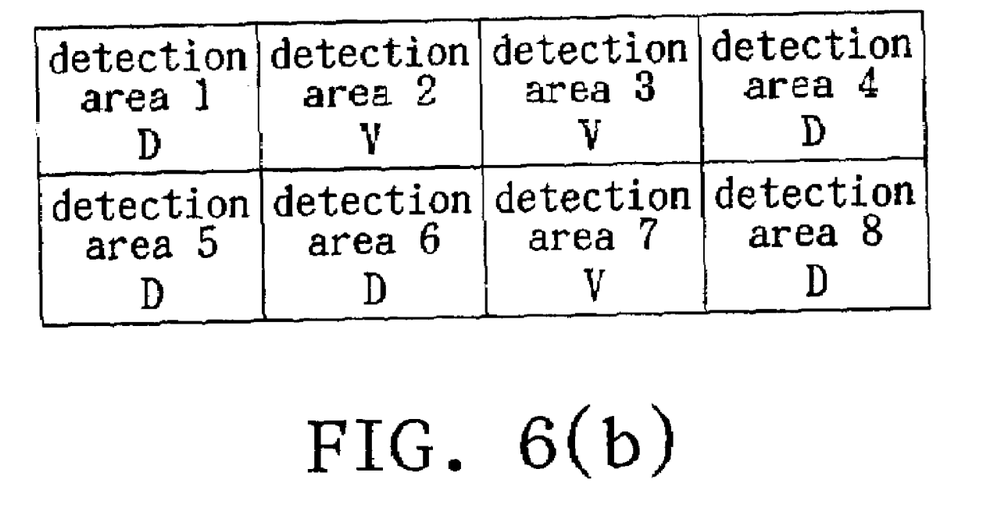

FIGS. 6(a)-6(b) are schematic diagrams about choosing a defect detection mode in accordance with the second embodiment of the present invention. The present preferred embodiment may be applied to an optical storage medium which is unformatted or whose defect distribution remains unknown. Assuming eight detection areas intended for data storage are disposed on the optical storage medium, as shown in FIG. 6(a), it is impossible to know the number of the defects in the detection areas 1 through 8 since the optical storage medium has not yet been formatted. It is expedient to set all the detection areas to the write detection mode D first. If it is found from the detection areas 2, 3 and 7 that the respective accumulated quantity of defects is greater than a threshold value within the duration of a data writing operation and defect detection operation, the corresponding detection area would be changed from the write detection mode D to the write verification mode V, as shown in FIG. 6(b).

Figure 7:
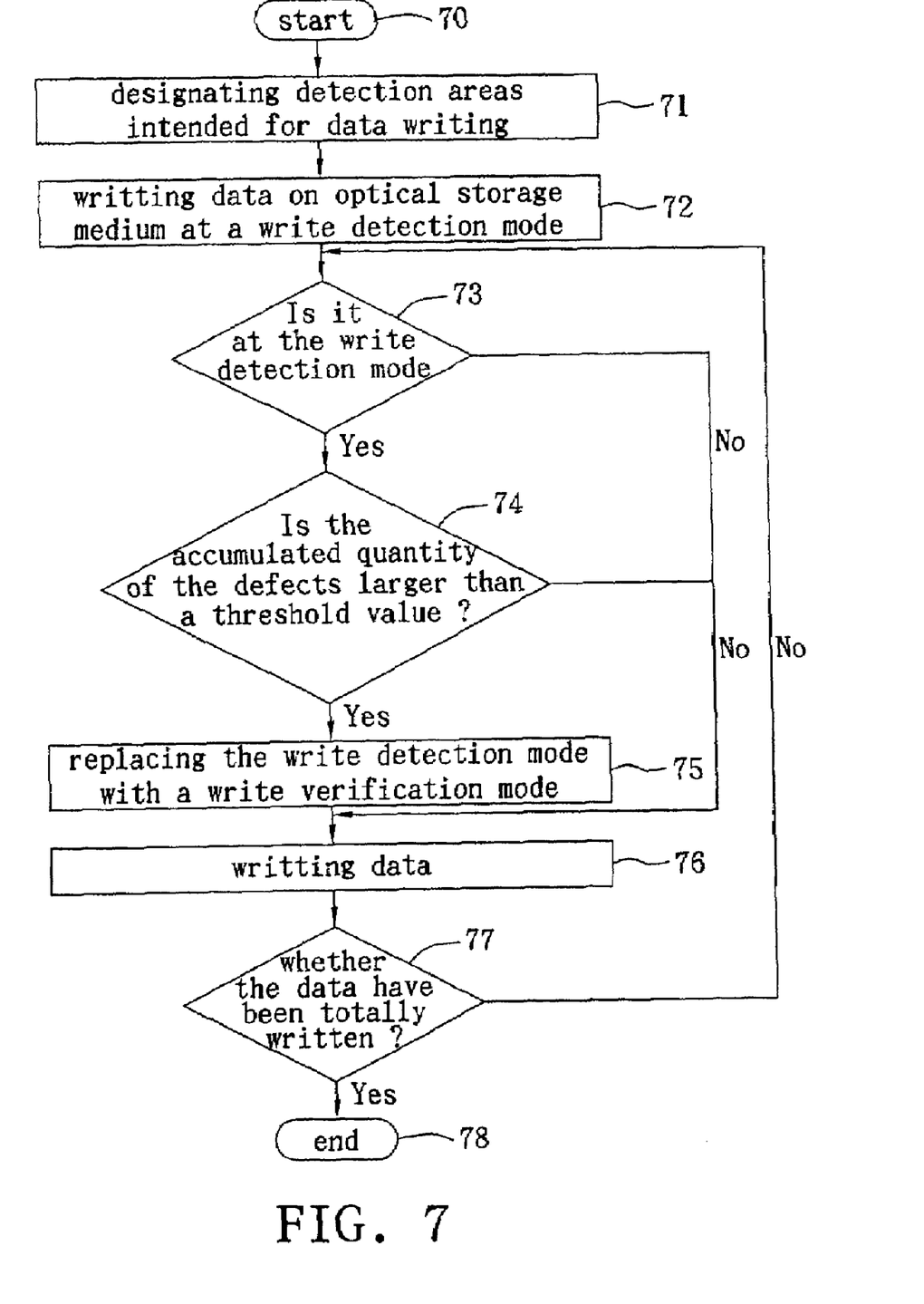
FIG. 7 is a flow chart about choosing a defect detection mode in accordance with the second embodiment of the present invention.

FIG. 7 is a flow chart about choosing a defect detection mode in accordance with the second embodiment of the present invention. At the commencement of data writing, an optical storage medium is divided into a plurality of detection areas intended for data writing, as shown in Steps 70 and 71. Then, according to the instructions of Step 72, data are written in the detection areas at the write detection mode.

Once a detection area is set to the write detection mode, it is necessary to check whether the number of accumulated defects is greater than the threshold value during the actual defect detection operation. If the number of accumulated defects is greater than the threshold value, the detection area is configured anew and thereby set to a defect detection mode of write verification, as shown in Steps 73, 74 and 75. If the number of accumulated defects is still smaller than the threshold value, the defect detection mode need not be altered. In a situation where the detection area has been set to the write verification mode, what should be performed is to go directly to Step 76 to write data in the detection area rather than to execute the operations of Steps 74 and 75. Once all the intended data are written in the plurality of detection areas, the whole process ends; otherwise it is still necessary to go back to Step 73 to execute related steps one by one, as shown in Steps 77 and 78.

The above-described embodiments of the present invention are intended to be illustrative only. Numerous alternative embodiments may be devised by persons skilled in the art without departing from the scope of the following claims.

What is claimed as new and desired to be protected by Letters Patent of the United States is:

1. A method for choosing the defect detection mode of an optical storage device, comprising the steps of:
    designating at least one detection area on an optical storage medium as a data storage area;
    setting the detection area to a write detection mode for defect detection;
    writing data into the detection area at a write detection mode; and
    setting the detection area to a write verification mode for defect detection in place of the write detection mode if the number of accumulated defects in the detection area exceeds a default threshold value.

2. The method for choosing the defect detection mode of an optical storage device of claim 1, further comprising the steps of:
    counting and recording the defects in the detection area; and
    setting the detection area to a write verification mode for defect detection if the number of the defects in the detection area exceeds the default threshold value.

3. The method for choosing the defect detection mode of an optical storage device of claim 1, wherein the detection area is one of a plurality of data areas on the optical storage medium.

4. The method for choosing the defect detection mode of an optical storage device of claim 1, wherein the detection area is one of a plurality of data packets on the optical storage medium.

5. The method for choosing the defect detection mode of an optical storage device of claim 1, wherein there is only one detection area, which includes all the data storage areas of the optical storage medium.

6. A method for choosing the defect detection mode of an optical storage device, comprising the steps of:
    designating at least one detection area on an optical storage medium as a data storage area;
    recording the number and locations of defects in the detection area on a defect table;
    setting the detection area to a write detection mode for defect detection and writing data into the detection area at the write detection mode if the number of the defects listed in the defect table is smaller than a default threshold value;
    setting the detection area to a write verification mode for defect detection and writing data into the detection area at the write verification mode if the number of the defects listed in the defect table is larger than the default threshold value; and
    setting the detection area to the write verification mode for defect detection in place of the write detection mode if the number of accumulated defects in the detection area exceeds the default threshold value within the duration of data writing.

7. The method for choosing the defect detection mode of an optical storage device of claim 6, further comprising a step of formatting the data storage area at the write detection mode.

8. The method for choosing the defect detection mode of an optical storage device of claim 6, wherein the detection area is one of a plurality of data areas on the optical storage medium.

9. The method for choosing the defect detection mode of an optical storage device of claim 6, wherein the detection area is one of a plurality of data packets on the optical storage medium.

10. The method for choosing the defect detection mode of an optical storage device of claim 6, wherein there is only one detection area, which includes all the data storage areas of the optical storage medium.

* * * * *